United States Patent [19]

Banji

[11] Patent Number: 5,458,473
[45] Date of Patent: Oct. 17, 1995

[54] MOLDS FOR FORMING GOLF BALLS

[75] Inventor: Masatoshi Banji, Kobe, Japan

[73] Assignee: Sumitomo Rubber Industries, Ltd., Kobe, Japan

[21] Appl. No.: 221,899

[22] Filed: Apr. 1, 1994

[30] Foreign Application Priority Data

Jun. 21, 1993 [JP] Japan ................... 5-174786

[51] Int. Cl.⁶ ............................. B29C 45/44
[52] U.S. Cl. ..................... 425/116; 249/91; 273/215; 273/232; 425/127; 425/129.1; 425/468; 425/556; 425/577; 425/DIG. 58
[58] Field of Search ........................ 425/116, 127, 425/129.1, 468, 577, 556, DIG. 58; 249/91, 93; 273/215, 232

[56] References Cited

U.S. PATENT DOCUMENTS 4,959,000  9/1990  Giza ........................... 425/127
5,122,046  6/1992  Lavallee et al. .................. 425/577

Primary Examiner—Tim Heitbrink
Attorney, Agent, or Firm—Armstrong, Westerman, Hattori, McLeland & Naughton

[57] ABSTRACT

An upper die and a lower die are provided to form a cavity. The upper die and the lower die have respectively slots made through them in parallel with each other, and the slots are connected to the cavity. Also, the slots have pins reciprocatably inserted through them. The pins are reciprocated such that they are advanced to greatly project their ends into the cavity, and that they are returned to allow their head portions to remain slightly projected into the cavity. The pins respectively comprise a body portion in a bar-shaped configuration, a head portion connected to the end surface of this body portion. The end surface of the body portion is furnished with the substantially same radius of curvature as the bottom surface of the cavity. Also, the body portion is shaped in the surface thereof so as to have a circular configuration as viewed from the center of the cavity.

7 Claims, 3 Drawing Sheets

MOLDS FOR FORMING GOLF BALLS

BACKGROUND AND SUMMARY OF THE INVENTION

The present invention relates to improvements in a mold for forming golf balls.

In general, metallic molds for injection molding operation or for pressing operation or other similar molds are used to mold golf balls. In such conventional metallic molds, hold pins, vent pins, ejector pins and the like are employed. This kind of well known metallic molds are such as shown in FIG. 4 of the accompanying drawings and as described in U.S. Pat. No. 5,122,046.

A metallic mold 100 depicted in FIG. 4 of the accompanying drawing is fitted with pins, or hold pins 101 such that they can be reciprocated. The hold pins 101 are located in the metallic mold such as to coincide with the positions of dimples made in a golf ball intended to be manufactured by using the metallic mold 100, and the hold pins 101 form dimples in the golf ball by means of their head portions 102. The head portions 102 of the hold pins 101 are curved as shown in FIG. 5A of the accompanying drawings by electrospark machining operation, engraving or other similar means.

However, as viewed from the center O of the cavity which is shown in the metallic mold in FIG. 4, the head portions 102 of the hold pins 101 respectively look elliptical as shown in FIG. 5B. It follows from this that the dimples formed by using the head portions 102 of the hold pins 101 are also elliptical in their configurations.

The dimples made by means of the head portions 102 are thus uncircular in their configurations unlike other dimples formed without the use of the head portions 102. For this reason, golf balls molded by using the conventional molds are bad in their external appearances, while at the same time, they are inferior in their flying performance.

Also, in a metallic mold disclosed for golf balls in U.S. Pat. No. 5,122,046, a hold pin used therein is hemispherical in the configuration of the head portion thereof. Therefore, this mold undergoes the following problems.
(i) The hold pins forms in an elliptical configuration the dimples of the golf balls produced by using this mold.
(ii) The dimples of the golf balls are not directed in their axes to the centers of the golf balls.
(iii) Therefore, the golf ball thus obtained are bad in their external appearances, while at the same time, they are inferior in their flying performance.

It is therefore an object of the present invention to provide for dimples of the same configuration in golf balls intended to be molded by using the metallic mold according to the present invention, whereby the golf balls are improved in their external appearances.

Also, it is another object of the present invention to provide for molding of golf balls which are superior in their flying performance.

BRIEF DESCRIPTION OF THE DRAWINGS

The present invention will be described with reference to the accompanying drawings, in which.

DETAILED DESCRIPTION OF THE PREFERRED EMBODIMENT

The single preferred embodiment of the mold according to the present invention will be described with reference to the accompanying drawing.

Figure 3:
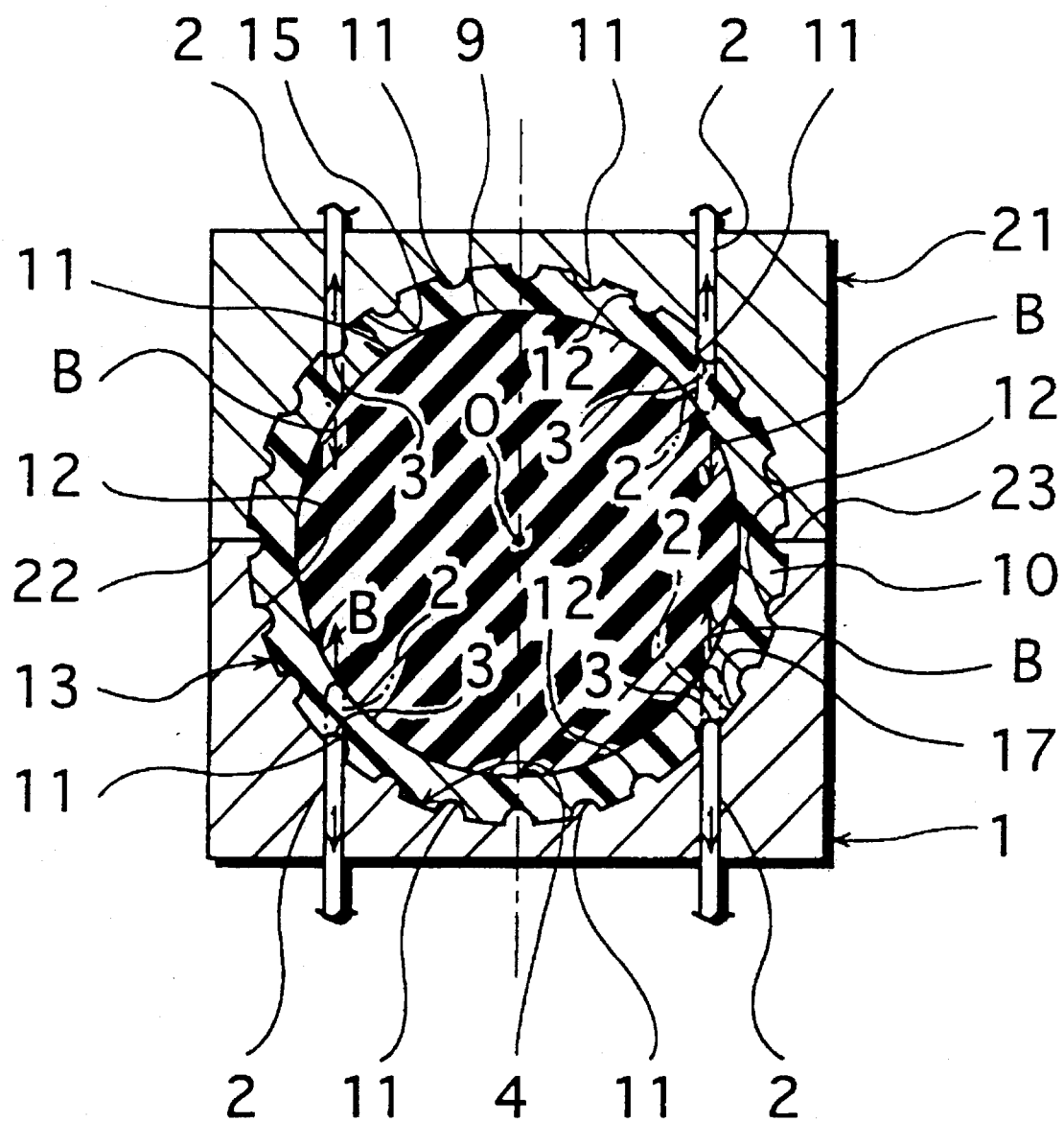
FIG. 3 is a longitudinal sectional view of the metallic mold, which shows molding condition therein.
Figure 4:
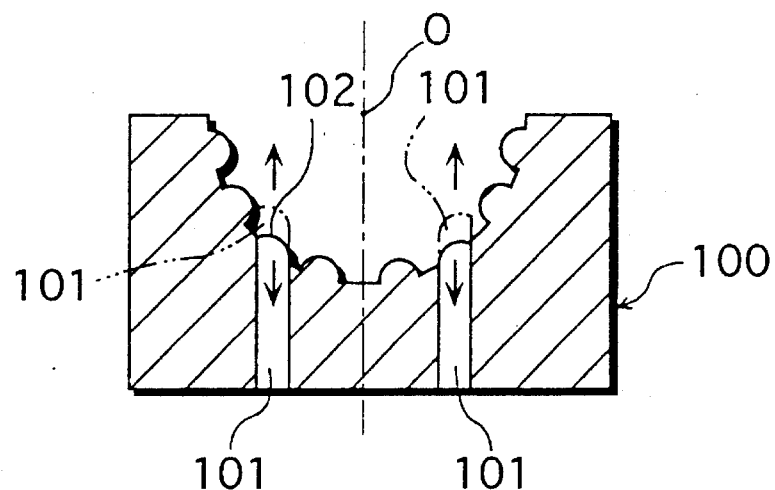
FIG. 4 is a longitudinal sectional view of a conventional metallic mold.
Figure 5A:
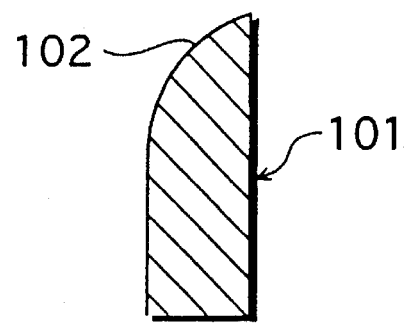
FIG. 5A is an explanatory view of a conventional hold pin which is shown in FIG. 4.
Figure 5B:
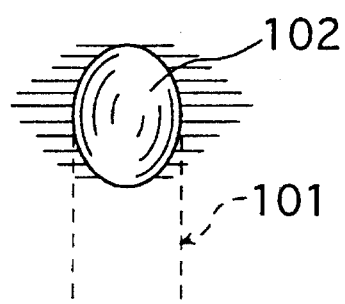
FIG. 5B is another explanatory view of the conventional hold pin shown in FIG. 5A, as viewed from the center of the cavity in FIG. 5A.

A metallic mold for manufacturing golf bails according to the single preferred embodiment of the present invention which is shown in FIG. 3 includes an upper die 21 and a lower die 1. The upper die 21 is placed on the lower die 1, to thereby form a cavity 4. The upper die 21 and the lower die 1 are fitted with pins, or hold pins 2.

The hold pins 2 are located in the directions in which they intersect perpendicularly with mating surfaces 22 and 23 of the upper die 21 and the lower die 1. That is to say, each of the hold pins 2 is arranged such as to intersect perpendicularly with a plane of a golf ball intended to be molded by using this metallic mold, which includes the seam, or the parting line of the golf ball. Also, each pin 2 is arranged to be axially reciprocated.

In molding operation, a head portion 3 of each pin 2 is projected into the cavity 4 of the metallic mold, to thereby form a single dimple in a golf ball intended to be manufactured.

Figure 1:
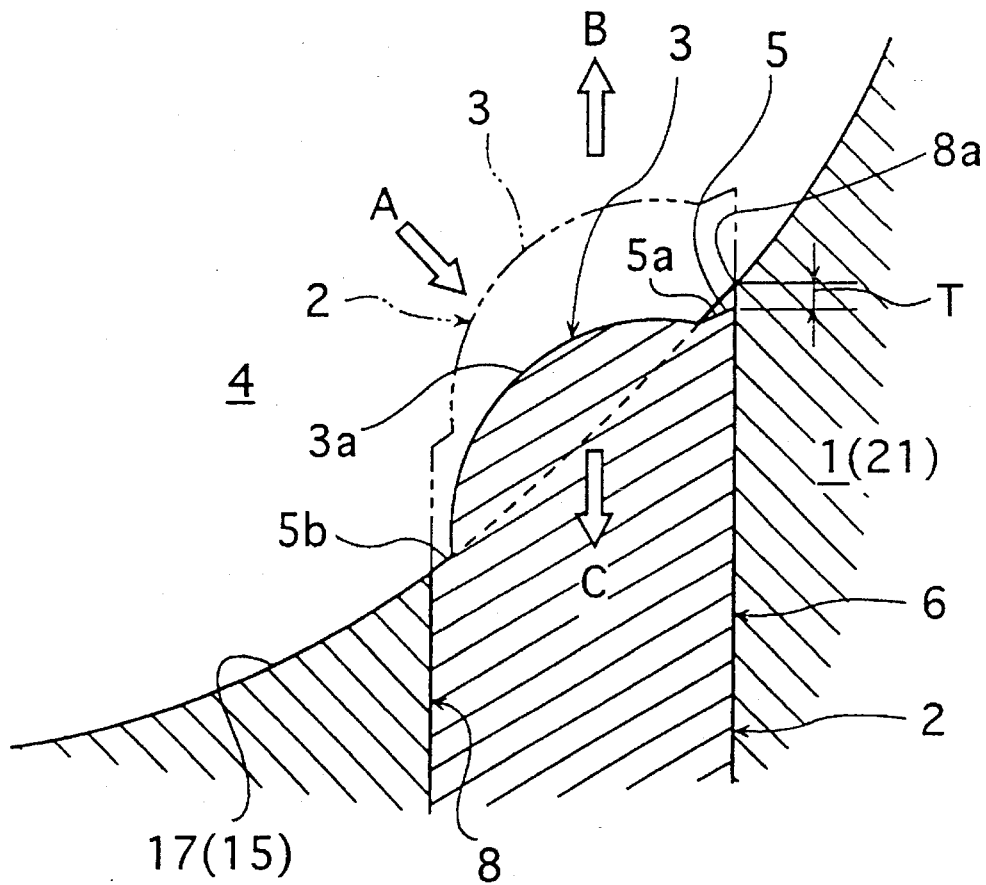
FIG. 1 is an enlarged cross sectional view of a principal portion of a metallic mold of the present invention according to a single preferred embodiment of the present invention.

As shown in FIG. 1, the hold pin 2 comprises a body portion 6 in a ball-shaped configuration, in which an end surface 5 thereof is formed in a configuration of a concave surface furnished with the substantially same radius of curvature as the bottom surface of the cavity 4, and the head portion 3 formed on the end surface 5 so that the head portion 3 and the end surface 5 are integrated into a single unit body. The head portion 3 of the hold pin is as a whole in a configuration of, so to speak, a circular convex lens.

Figure 2:
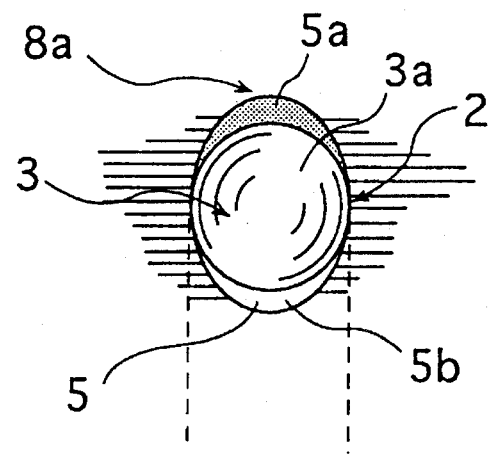
FIG. 2 is a view taken in the direction of the arrow head A in FIG. 1.

As shown in FIG. 2, a surface 3a of this head portion 3 is circular in the configuration thereof as viewed from the center O of the cavity of the metallic mold, which is shown in FIG. 3, namely, in the view taken in the direction of the arrowhead A in FIG. 1.

More specifically, in FIGS. 1, 2 and 3, the golf-ball forming metallic mold according to the present invention comprises the upper die 21 which is provided with a hemispherical concave portion 15 for molding golf balls, and with a plurality of slots 8 which extend to the hemispherical concave portion 15, and are also arranged in the direction in which the slots 8 intersect perpendicularly with the mating surface 22 of the upper die 21, the lower die 1 which is furnished with a hemispheric concave portion 17 for molding golf balls, and with a plurality of slots 8 which extend to the hemispherical concave portion 17, and are also arranged in the direction in which the slots 8 intersect perpendicularly with the mating surface 23 of the lower die 1, and the hold pins 2 which are reciprocably inserted into the slots 8 of the upper die 21 and those of the lower die 1, and also possess their head portions 3 formed in a configuration of a convex spherical surface such that the head portions respectively look circular as viewed from the center O of the cavity 4 formed by means of the hemispherical concave portion 15 of the upper die 21 and the hemispherical concave portion 17 of the lower die 1.

Also, as shown in FIGS. 1 and 2, a difference is occasionally made in height between an upper semicircular arc portion 5a of the end surface 5 of the body portion 6 of the hold pin 2 and an outer circumferential edge 8a of the slot 8 through which the hold pin 2 is inserted. This difference in height is shown by using dotted area in portion 5a in FIG. 2. (Occasionally, between a lower semicircular arc portion 5b of the end surface 5 of the body portion 6 and the outer circumferential edge 8a of the slot 8 is a similar difference made in height.)

Such a difference in height is identified as a minute clearance T in FIG. 1, which is measured axially of the body portion 6 of the hold pin 2. This minute clearance T is desired to be zero in value on both the upper semicircular arc portion 5a side and the lower semicircular arc 5b portion side. In practice, however, reduction of this clearance T to zero in value is difficult of achievement from manufacturing viewpoints. Therefore, it is advisable to make this clearance in range in which this metallic mold is free from any trouble in the external appearance thereof, namely, within range of 0.02 mm or less.

If the minute clearance T is negative in value, namely, if the upper or lower semicircular arc portion 5a or 5b juts out from the outer circumferential edge 8a of the slot 8, recesses are made in a golf ball 13 as molded in addition to originally intended dimples. See FIG. 3. Therefore, a clearance T of any negative value is undesired and obviated.

The upper die 21 is identical in construction to the lower die 1 shown in FIG. 1. Therefore, any constructional description of the upper die 21 is omitted.

Next, the metallic mold as described in the foregoing is described in the operation thereof.

As shown with a two-dot chain line in FIG. 3, the hold pin 2 is projected into the cavity 4 as shown with the arrowhead B by using a reciprocating mechanism (not shown), to thereby allow the hold pin to hold a core 9 of an intended golf ball within the cavity 4. That is to say, the hold pin 2 functions to form an even clearance in any place of the ball core 9 between the ball core 9 and the inner circumferential surface of the cavity 4. In other words, the ball core 9 is held so that the central point 9 thereof coincides with the center O of the cavity 4.

With the ball core 9 thus held, if the cavity 4 is fed with a molten resin, this resin forms a covering layer 10 which sheathes the outer surface of the ball core 9 therewith. In this case, the hold pins 2 are withdrawn from the cavity 4 as shown with the arrowhead C in FIG. 1 by using a reciprocating means (not shown) so that the hold pins 2 are slightly jutting in their head portions 3 alone within the cavity 4. As a result, a plurality of dimples 11 are partly formed by using the head portions 3 of the hold pins 2 which are slightly jutting within the cavity 4. The dimples formed by means of the head portions 3 of the hold pins 2 are circular in their configurations as the other dimples made by using fixed type dimple forming protrusive members 12, and are also directed in their deepest portions to the center of the golf ball under manufacture if they are viewed from the direction which intersects perpendicularly with the surface of the golf ball.

That is to say, the dimples 11 formed by using the head portions 3 of the hold pins 2 of the metallic mold according to the present invention are identical to the other dimples 11 made by means of the fixed type dimple forming protrusive members 12 in that the former are dented towards the center of the golf ball having such dimples formed on the surface thereof, and are circular in their configurations. (It is stated for comparison that the dimples obtained by using the metallic mold disclosed in U.S. Pat. No. 5,122,046 are not dented in the direction of a golf ball having such dimples formed on the surface thereof, and are also elliptical in their configurations.)

The hold pins 2 may be alternatively a vent pin, an ejector pin or other suitable pin. Also, the hold pins 2 may be increased or decreased in number. Moreover, the metallic mold may be for injection molding operation or pressing operation.

As is apparent from the foregoing, therefore, the metallic mold according to the present invention allows golf balls to be molded without deforming their configurations into ellipses in particular.

Also, in the present invention, in order to use an existing metallic mold to manufacture the metallic mold according to the present invention, the hold pin 2 is only required to be arranged as shown and described in the foregoing. For this reason, the metallic mold according to the present invention can be simply manufactured at a lower manufacturing cost.

For deeper understanding of the present invention, an alternatively available construction of the metallic mold according to the present invention will be described hereinafter.

The holding pins 2 are all disposed radially of the cavity 4, and their head portions 3 are shaped in a hemispherical configuration. As a result, the head portions 3 of the hold pins 2 are circular on their surfaces as viewed from the center O of the cavity 4, and this improves the performance of the external appearances of the dimples 11 produced by using the hold pins 2 thus arranged.

However, if the hold pins 2 are disposed radially of the cavity 4 as described in the foregoing, the hold pins 2 are required to be separately reciprocated. Consequently, the reciprocating mechanism for the hold pins 2 is complicated as a whole in the construction thereof. This is a disadvantage of the alternative construction of the metallic mold.

Moreover, even if a conventional type metallic mold is modified in the construction thereof to use the foregoing alternative construction of the metallic mold, a larger scale of modification is required to be executed such as re-holing for the radial disposition of the hold pins, and reconstruction of the reciprocating mechanism for the hold pins. This is undesirous from cost saving viewpoints.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein. For example, the mold according to the present invention may be made from ceramics or plastic as well as of metal.

I claim:

1. A mold for molding a cover on a golf ball core, comprising an upper die and a lower die each die having a hemispherical concave cavity with a planar mating surface surrounding an open face of said cavity for joining said upper die and said lower die, with said hemispherical concave cavities together forming a spherical cavity for holding golf ball core and for molding cover on said core, each of said dies having a plurality of spaced slots extending through each said die into said cavity and arranged in a direction in which said slots, when projected, are along a line perpendicularly intersecting said planar mating surface; and a pin reciprocatably inserted into each of said slots of said dies and into said concave cavities, each pin having a head for contacting and supporting said golf ball core to be covered in said cavity, said pins being reciprocatably withdrawn from said cavity and into said slots as said cover is being formed and supports said core, said head of each of said pins having an upper semicircular arc portion and a lower semicircular arc portion with a spherical convex surface therebetween such that said spherical circular convex surface of said head of each said pin is circular when viewed from the center of said spherical cavity formed by said upper die and said lower die.

2. A mold for molding a cover on a golf ball core, provided with an upper die, a lower die, and pins inserted through holes made in each of the upper die and the lower die, wherein a reciprocating means is provided to allow the pins to be reciprocated so that said pins can be projected into a cavity formed by a hemispherical concave portion of the upper die and a hemispherical concave portion of the lower die, head portions of the pins are shaped on their surfaces in a configuration of a spherical convex surface so that said surfaces look circular as viewed from the center of said cavity, and each hole is arranged so as to direct a respective pin associated with the hole radially into the cavity.

3. The mold for molding a cover on a golf ball core as set forth in claim 1 or 2, wherein the pins are hold pins.

4. The mold for molding a cover on a golf ball core as set forth in claim 1 or 2, wherein the pins are vent pins.

5. The mold for molding a cover on a golf ball core as set forth in claim 1 or 2, wherein the pins are ejector pins.

6. The mold for molding a cover on a golf ball core, as set forth in claim 1 or 2, wherein said pins respectively comprise a body portion in a bar-shaped configuration in which the end surface thereof is a concave surface of substantially the same radius of curvature as the inner circumferential surface of said spherical cavity, and said head on the end of said head surface of said body portion so that said semicircular arc portions of said head and said inner circumferential surface are integrated when said pins are withdrawn from said spherical cavity.

7. The mold for molding a cover on a golf ball core, as set forth in claim 6, wherein a difference in height between said semicircular arc portion of said pins and said inner circumferential surface of said spherical cavity is not more than 0.02 mm when said pins are withdrawn from said spherical cavity.

* * * * *